United States Patent [19]

Wolf

[11] Patent Number: 4,614,441
[45] Date of Patent: Sep. 30, 1986

[54] APPARATUS FOR TEMPERATURE MEASUREMENT IN A SAUCEPAN HEATING SYSTEM

[75] Inventor: Kurt Wolf, Wildbad, Fed. Rep. of Germany

[73] Assignee: Kurt Wolf & Co. KG, Fed. Rep. of Germany

[21] Appl. No.: 671,541

[22] Filed: Nov. 15, 1984

[30] Foreign Application Priority Data

Nov. 15, 1983 [DE] Fed. Rep. of Germany ....... 3341234

[51] Int. Cl.⁴ .......................... G01J 5/28; G01K 13/00
[52] U.S. Cl. .................................... 374/130; 219/502; 318/685; 250/353; 374/121
[58] Field of Search ................ 374/9, 124, 123, 141, 374/130, 126; 219/502; 356/43; 250/342

[56] References Cited

U.S. PATENT DOCUMENTS

| | | | |
|---|---|---|---|
| 2,085,508 | 6/1937 | Neubert | 356/43 X |
| 2,302,554 | 11/1942 | Kingsbury | 356/43 X |
| 3,162,045 | 12/1964 | Kudelko | 356/43 X |
| 3,303,340 | 2/1967 | Hewett et al. | 374/130 |
| 3,405,269 | 10/1968 | Wood | 374/130 X |
| 3,560,714 | 2/1971 | McDonald | 219/502 |
| 3,745,834 | 7/1973 | Veltze et al. | 374/131 |
| 3,781,504 | 12/1973 | Harnden, Jr. | 219/502 X |
| 3,796,099 | 3/1974 | Shimotsuma et al. | 374/9 X |
| 4,260,251 | 4/1981 | Conrad | 356/43 X |
| 4,315,150 | 2/1982 | Darringer et al. | 250/353 X |
| 4,324,138 | 4/1982 | Davis et al. | 374/167 X |
| 4,513,201 | 4/1985 | Falk | 250/342 |

Primary Examiner—Daniel M. Yasich
Attorney, Agent, or Firm—Thomas W. Speckman

[57] ABSTRACT

This invention provides an apparatus for measuring the temperature of the contents of a saucepan in a heating system comprising a saucepan and its contents placed on and heated by a heating element. The invention provides saucepans having radiating surfaces encircling the pan in a transition area between the bottom and side wall of the pan, a radiation sensor with a focusing device aligned with the radiating surface of the saucepan placed on the heating element, and provides for the radiation sensor to be spaced from the radiating surface at a distance corresponding to the focal point of the radiation focusing device.

17 Claims, 2 Drawing Figures

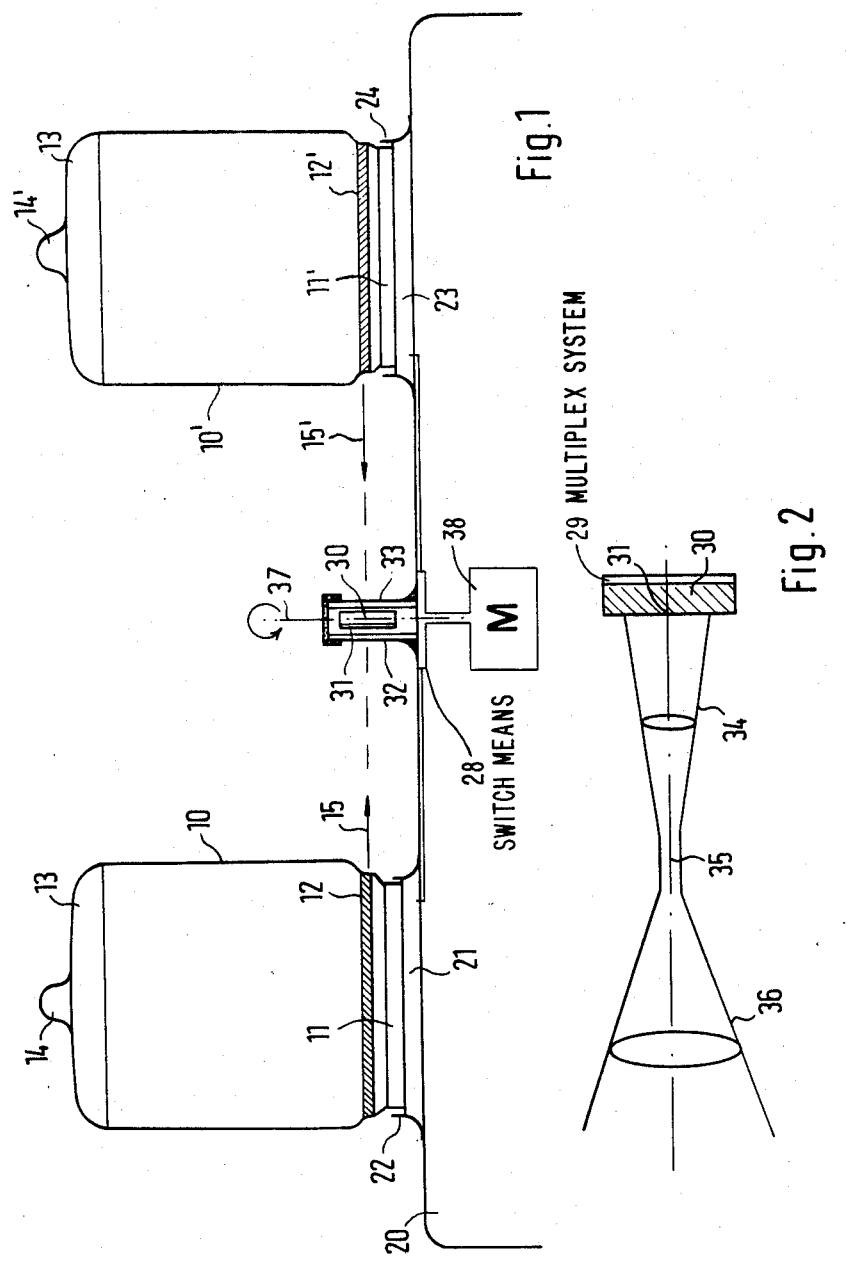

APPARATUS FOR TEMPERATURE MEASUREMENT IN A SAUCEPAN HEATING SYSTEM

BACKGROUND OF THE INVENTION

1. Field of the Invention

This invention relates to an apparatus for measuring the temperature of the contents of a saucepan in a heating system comprising a saucepan with its contents placed on and heated by a heating element.

2. Description of the Prior Art

Prior art devices of this type utilize temperature gauges mounted on the saucepan or inside the saucepan which generate analog data signals dependent upon the temperature. These data signals are primarily used to control the heat output of the heating element. Transmission of the data signals from the saucepan to the control unit located inside the stove or the like, has presented considerable problems. Transmission using a circuit between the saucepan and control unit is not practical because it makes handling the saucepan too cumbersome. Existing devices, therefore, use a wireless transmission component, usually an infrared component. However, this requires a battery-powered transmission device attached to the saucepan which must be removed for safety purposes when the pan is cleaned. Thus, additional construction limitations are required to implement removable attachment of the transmission device.

One objective of this invention is to provide an apparatus having the characteristics described above, yet the saucepan may be handled and cleaned like an ordinary saucepan, does not require batteries to operate the transmission device, and provides a sufficiently exact temperature measurement of the contents of the saucepan.

SUMMARY OF THE INVENTION

According to the present invention, this objective is attained as follows: saucepans are equipped with circular radiating surfaces located in the transition area between the bottom and the side wall of the saucepan, a radiation sensor with a focusing device is aligned with the radiating surface of the saucepan when it rests on the heating element, and the radiation sensor is located a distance from the radiating surface which relates to the distance of the focal point in the radiation measurement range of the radiation sensor from the entry surface of the radiation sensor. This apparatus exploits the generally known principle that any object with a temperature above absolute zero, which corresponds to $-273.16°$ C., emits electromagnetic radiation. The intensity of the radiation is related to the temperature of the object. Radiation sensors that can measure the intensity of the radiation are presently available. If the saucepans are provided with dull, dark colored, especially dull black circular radiating surfaces, a stationary radiation sensor can measure the intensity of the radiation, and thus the temperature at the radiating surface, regardless of how the saucepan is rotated on the heating element. Placement of the radiating surface in the transition area between the bottom and the side wall of the saucepan yields the most precise measurement result. This is because the temperature differential observed between the contents and the side wall of the saucepan is lowest at this location and the measurement is not distorted by the bottom of the saucepan which is considerably hotter. Since the distance between the radiating surface and the radiation sensor is limited when using a stove or the like, a radiation sensor with a focusing device is employed; the focusing device produces a focal point within the measurement range of the radiation sensor with a diameter of only a few millimeters at small distances of about 15 cm to 30 cm from the radiation sensor. The precise measurement range may then be adjusted to correspond to the width of the radiation surfaces and thus, the radiation surfaces need not be very wide.

All optical and electrical devices necessary to operate the apparatus of the present invention can be accommodated on a stove, or the like. Saucepans need not have any special features beyond the radiating surface and can be handled and cleaned like ordinary saucepans. These saucepans may also be pressure cookers.

To ensure that a saucepan placed on the heating element is always the same distance from the entry surface of a stationary radiation sensor, one embodiment ensures that saucepans will be placed at a fixed, predetermined position on the heating elements. This is accomplished most easily by surrounding the heating elements with a holding rim or the like that protrudes above the surface of the heating elements.

To ensure high utilization of radiation emitted by the radiating surfaces, the radiating surfaces of saucepans placed on heating elements must be aligned parallel to and coaxial with the entry surface of the radiation sensor.

To ensure that radiation emitted by the radiating surfaces is not distorted by heat from the bottom of the pot, the radiating surfaces encircle the saucepan and are perpendicular to the bottom of the saucepan.

Another embodiment provides that the entry surface of the radiation sensor is covered by a radiation permeable protective cover to protect the entry surface of the radiation sensor. These protective covers are easy to clean.

To calibrate the data signal emitted by the radiation sensor and transmitted to evaluation devices with the temperature of the contents of the saucepan, one embodiment provides that a saucepan filled with water may be used as a calibration element; when the water boils, the evaluation circuit of the radiation sensor is calibrated with the boiling temperature of water.

Since the radiation sensor is an expensive element, the cost of a stove having several heating elements may be substantially reduced by using a radiation sensor having a time multiplex system to monitor several saucepans which are arranged equidistant from the radiation sensor.

Time multiplex operation may be implemented, according to one embodiment, by using a mechanical positioning device to adjust and align the radiation sensor and its entry surface with the radiating surfaces of several saucepans in sequence. The evaluation circuit can easily sort the data signals which are transmitted by this method with reference to the corresponding heating element and the saucepan placed on it.

Another embodiment providing time multiplex operation places the radiation sensor and its entry surface in communication with the radiating surfaces of several saucepans by means of optical systems, the optical signals alternately transmitted or blocked by means of dimming devices such as shutters. Light regulators which can be electronically controlled and have no mechanical moving parts are preferred for use in transmission and blocking of the optical signals.

Another embodiment features a pivoting and adjustable mirror which may be used to align a stationary radiation sensor sequentially with radiating surfaces of several saucepans.

BRIEF DESCRIPTION OF THE DRAWINGS

This invention will be explained in more detail with reference to an embodiment shown in the drawings, in which:

FIG. 1 shows a schematic side view of a stove having two heating elements with saucepans placed thereon; and FIG. 2 shows the measurement area of the radiation sensor with a focusing device.

DESCRIPTION OF PREFERRED EMBODIMENTS

As shown in FIG. 1, stove 20 has two heating elements 21, 23 which protrude slightly above the top of stove 20 and are surrounded by raised holding rims 22, 24. These holding rims ensure that saucepans 10, 10' are placed in predetermined positions on heating elements 21, 23. Saucepans 10, 10' may be rotated in any direction on heating elements 21, 23. Valves 14, 14' are illustrated schematically on lids 13, 13' and indicate that saucepans 10, 10' may also be pressure cookers. Bottoms 11, 11' of saucepans 10, 10' contact electrical heating elements 21, 23. Bottoms 11, 11' merge into radiating surfaces 12, 12' which may take the form of an offset and then merge into the side walls of the saucepan. Radiating surfaces 12, 12' form a band encircling saucepans 10, 10' and comprise a dull dark color, preferably dull black, to obtain substantially complete radiation of heat rays.

Regardless of how saucepans 10, 10' are rotated, electromagnetic rays, shown as arrows 15, 15', travel to radiation sensor 30 with its focusing device along a straight line path. Suitable radiation sensors have an operating radiation range for sensing electromagnetic radiation with wavelengths of about $8\mu$ to about $20\mu$. One example of a suitable radiation sensor is the "Thermopile detector 1M", manufactured by Minthorne International Company Inc., Freeport, N.Y. Radiation sensor 30 is senstive to the wavelength of radiation being emitted and transmits a signal from its evaluation circuit which corresponds to the temperature of the contents of the saucepan. The evaluation circuit can be easily calibrated by filling the saucepan with water and bringing it to a boil. Since the boiling temperature of water is known, the evaluation circuit can be calibrated directly with this temperature inside the saucepan. Concerns regarding heat losses arising from radiation being transmitted through the side wall of the saucepan and variations in the radiation intensity of radiating surfaces 12, 12' are thus eliminated.

Due to the small distances between saucepan 10, 10' placed on heating elements 21, 23 and radiation sensor 30 located on stove 20, a radiation sensor 30 having a focusing device must be used. As shown in FIG. 2, the measurement range of radiation sensor 30 has focal point 35 with a diameter of a few millimeters, for example 3-6 mm, at a small distance from entry surface 31. Focal point 35 in the measurement range of radiation sensor 30 with a focusing device must be adjusted to coincide with radiation from radiating surfaces 12, 12' of saucepans 10, 10'. This depends upon the distance between radiation sensor 30 and the side of radiating surface 12, 12' which faces it. Since focal point 35 within the measurement range increases in diameter as the distance from the radiation sensor increases, as shown by sections 34 and 36, it is important that saucepan 10, 10' is positioned on the heating element so that the distance from radiating surfaces 12, 12' cannot change substantially. This is the purpose of holding rims 22, 24. Different positioning arrangements may also be utilized.

The illustrated embodiment shows a simplified apparatus. Since radiation sensor 30 is an expensive module, the apparatus may be designed to incorporate a time multiplex system 29 of a known type to sequentially measure the temperature in several saucepans. Entry surface 31 may be aligned with radiating surfaces 12, 12' sequentially by means of a known type of a mechanical positioning device, such as stepping motor 38, which sequentially positions radiation sensor 30 the same distance from each radiating surface 12, 12'. The axis of rotation 37 indicates this mechanical turning in schematic form. The illustrated embodiment also shows radiation permeable protective covers 32, 33 covering entry surface 31 of radiation sensor 30. These protective covers are easy to clean. The permeability characteristics of protective covers 32, 33 must be designed to match the operating radiation range of radiation sensor 30, which utilizes wavelengths of about 8 $\mu$m–20 $\mu$m.

There are other ways to utilize a time multiplex process. One example of a known motor control unit to adjust an optical measuring system is disclosed in FIG. 5 in the U.S. Pat. No. 2,302,554. Rays 15, 15' may be conducted by an optical system to entry surface 31 of a stationary radiation sensor 30. Dimming devices may be connected to these optical systems which provide the option of transmitting the optical signals or dimming them. Time multiplex operation can be implemented by utilizing cyclical control of these dimming devices. The evaluation circuit then must sort the data signals received in a cyclical manner, according to known methods. A missing data signal may indicate that the wrong heating element is being used and that another element is turned on. Electronically controlled light regulators are preferred as dimming devices, such as those used as electronic shutters in cameras, and the like.

The absence of a data signal transmitted by radiation sensor 30 which is identified as originating from a heating element 21, 23 which has been switched on, may be classified as a trouble signal after a certain preset time has elapsed, and the trouble signal may be utilized by switch 28 to switch off heating element 21, 23. If radiation sensor 30 does not register any radiation reception after the preset time has elapsed, there is no saucepan on the heating element. If, however, there is no data signal from a heating element that is not switched on, there is no danger and the temperature need not be measured in the time multiplex process. The same monitoring process can be implemented for a single heating element with its radiation sensor aligned with it.

Alignment of the heat rays emitted from radiating surfaces 12, 12' of several saucepans 10, 10' with a stationary radiation receiver 30 may be achieved by means of a pivoting adjustable mirror. This arrangement has the advantage that loss of heat from the transition area of the saucepan is negligible.

I claim:

1. Apparatus for measuring the temperature of the contents of a saucepan in a heating system comprising said saucepan (10, 10') with its said contents placed on and heated by a heating element (21, 23), wherein said saucepan has a radiating surface (12, 12′) encircling said saucepan in a transition area between the bottom (11, 11′) and the side wall of said saucepan, and said radiating surface radiates electromagnetic radiation related to the temperature of said radiating surface; and a radiation sensor (30) spaced within a measurement range from said radiating surface with an operating radiation range for sensing electromagnetic radiation having a wavelength of from about 8 μm to about 20 μm, a focusing means with a focal point spaced from said radiation sensor, said measurement range determined by said focal point, whereby electromagnetic radiation emitted by said radiating surface is sensed by said radiation sensor to determine said temperature at said radiating surface.

2. Apparatus according to claim 1, wherein said entry surface of said radiation sensor (30) is covered with a radiation permeable protective cover (32, 33).

3. Apparatus according to claim 1, wherein placement means for positioning said saucepan (12, 12′) on said heating element (21, 23) comprise holding rims (22, 24) surrounding and protruding above the surface of said heating elements (21, 23).

4. Apparatus according to claim 3, wherein said radiating surfaces (12, 12′) on said saucepans (10, 10′) are aligned parallel to and coaxial with said entry surface (31) of said radiation sensor (30).

5. Apparatus according to claim 4, wherein said radiating surfaces (12, 12′) are at right angles to said bottom (11, 11′) of said saucepan (10, 10′).

6. Apparatus according to claim 5, wherein said radiating surfaces (12, 12′) are a dull, dark color.

7. Apparatus according to claim 6, wherein said entry surface of said radiation sensor (30) is covered with a radiation permeable protective cover (32, 33).

8. Apparatus according to claim 7, wherein said radiation sensor additionally comprises a time multiplex system to monitor a plurality of said saucepans (10, 10′) arranged equidistant from said radiation sensor (30).

9. Apparatus according to claim 8, additionally comprising a stepping motor (38) capable of adjusting and aligning said radiation sensor (30) sequentially with respect to said radiating surfaces (12, 12′) of said saucepans (10, 10′) by mechanically rotating said radiation sensor on an axis of rotation (37).

10. Apparatus according to claim 8, additionally comprising optical means providing means for transmitting or blocking signals from said plurality of saucepans directed to said radiation sensor (30).

11. Apparatus according to claim 7, wherein said radiation sensor additionally comprises means for detecting the absence of a data signal from a specific heating element (21, 23, classifying said absence as a trouble signal after a predetermined time has elapsed, and means for switching off said heating element (21, 23) in response to said trouble signal.

12. Apparatus according to claim 5, wherein said radiating surfaces (12, 12′) comprise a dull black color.

13. Apparatus according to claim 1, additionally comprising a time multiplex system to monitor a plurality of said saucepans (10, 10′) arranged equidistant from said radiation sensor (30).

14. Apparatus according to claim 13, additionally comprising a stepping motor (38) capable of adjusting and aligning said radiation sensor (30) sequentially with respect to said radiating surfaces (12, 12′) of said saucepans (10, 10′) by mechanically rotating said radiation sensor on an axis of rotation (37).

15. Apparatus according to claim 1, wherein said radiating surfaces (12, 12′) on said saucepans (10, 10′) are aligned parallel to and coaxial with said entry surface (31) of said radiation sensor (30).

16. Apparatus according to claim 1, wherein said radiating surfaces (12, 12′) are at right angles to said bottom (11, 11′) of said saucepan (10, 10′).

17. Apparatus according to claim 1, wherein said radiating surfaces (12, 12′) are a dull, dark color.

* * * * *